United States Patent
Kotlarski

(10) Patent No.: US 6,178,588 B1
(45) Date of Patent: Jan. 30, 2001

(54) DEVICE FOR LINKING A WIPER BLADE TO A WIPER ARM

(75) Inventor: Thomas Kotlarski, Buehlertal (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/242,978

(22) PCT Filed: Jun. 18, 1998

(86) PCT No.: PCT/DE98/01675

§ 371 Date: Feb. 26, 1999

§ 102(e) Date: Feb. 26, 1999

(87) PCT Pub. No.: WO99/02380

PCT Pub. Date: Jan. 21, 1999

(30) Foreign Application Priority Data

Jul. 11, 1997 (DE) .............................................. 197 29 862

(51) Int. Cl.$^7$ ...................................................... B60S 1/40
(52) U.S. Cl. ...................................... 15/250.32; 15/250.43
(58) Field of Search ........................... 15/250.32, 250.43, 15/250.44, 250.451, 250.361, 250.33, 250.48

(56) References Cited

U.S. PATENT DOCUMENTS

| | | | |
|---|---|---|---|
| 2,056,777 | * | 10/1936 | Evans . |
| 3,838,475 | * | 10/1974 | Quinlan et al. . |
| 3,872,537 | * | 3/1975 | Bianchi . |
| 4,028,770 | * | 6/1977 | Appel . |
| 4,120,069 | * | 10/1978 | Sharp et al. . |
| 5,065,474 | * | 11/1991 | Charng . |
| 5,485,650 | * | 1/1996 | Swanepoel . |

FOREIGN PATENT DOCUMENTS

| 44399 | * | 7/1956 | (DE) .................................. 15/250.32 |
|---|---|---|---|
| 2 344 876 | | 3/1974 | (DE) . |

* cited by examiner

*Primary Examiner*—Gary K. Graham
(74) *Attorney, Agent, or Firm*—Michael J. Striker

(57) ABSTRACT

A device for connecting a wiper blade (10) for windows of motor vehicles to a driven wiper arm (19), guided on the motor vehicle, in which the wiper blade has a striplike elongated, spring-elastic support element (12) for an elongated, rubber-elastic wiper strip (14), disposed parallel to the longitudinal axis on the support element (12) and capable of being pressed against the window (26), from each of whose two long sides a respective projection (36, 38) protrudes as a connection means toward the wiper blade; the common longitudinal axis (35) of the two projections is crosswise to the longitudinal axis of the support element and is located in a plane parallel to the window, and each projection engages a recess 62, assigned to it, in the wiper arm (19). A connecting device that is especially favorable in terms of the choice of materials is obtained if the projections (36, 38) are disposed on a separate component (18) that is firmly joined to the support element (12).

5 Claims, 3 Drawing Sheets

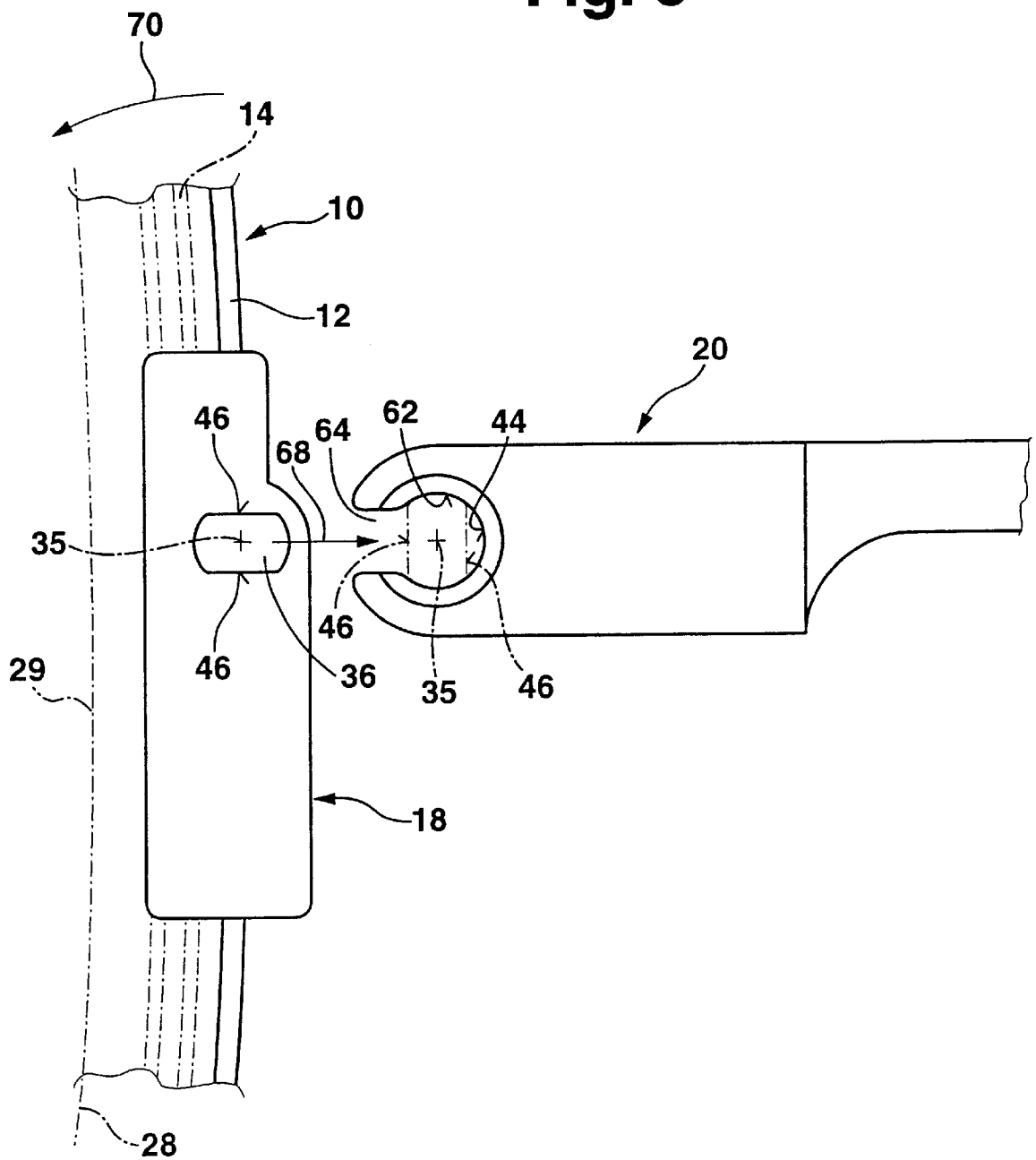

DEVICE FOR LINKING A WIPER BLADE TO A WIPER ARM

BACKGROUND OF THE INVENTION

The present invention relates to a device for connecting a wiper blade for windows of motor vehicles to a driven wiper arm guided on a motor vehicle.

In wiper blades the support element for the entire field swept by the wiper blade is intended to assure the most uniform possible distribution of the wiper blade contact pressure against the window that originates at the wiper arm. By a suitable curvature of the unstressed support element— that is, when the wiper blade is not contacting the window— the ends of the wiper strip, pressed completely onto the window during wiper blade operation, are stressed by the then-stressed support element toward the window, even if the radii of curvature of spherically curved vehicle windows change for every wiper blade position. The curvature of the wiper blade must accordingly be somewhat greater than the greatest curvature measured in the field to be wiped in the window in question. Thus the support element replaces the complicated support bracket construction with two spring rails, disposed in the wiper strip, of the kind used in the conventional wiper blades discussed above. A wiper blade of this kind should be capable of being connected in captive fashion to the wiper arm in a simple way and equally simply removed from it again.

The invention takes this connecting device as its point of departure. In a known connecting device of this type (German Published, Non-Examined Patent Application DE-OS 23 44 876), the support element is made from a plastic. The two lateral connection projections are formed directly onto the support element and therefore comprise the same material as the support element. In wiper blade operation, especially high demands for elasticity are made of the support element, because it is intended to distribute the contact force, acting on the wiper blade via the wiper arm and oriented toward the window, as uniformly as possible over the entire length of the wiper blade, specifically even if the radii of curvature of the windows, which as a rule are spherically curved, change constantly in the region of the window to be swept by the wiper blade. Conversely, stringent demands for wear resistance together with good sliding properties are made of the projections. As a result, in designing the known wiper blade, or the support element belonging to it, compromises have to be made that stand in the way of an optimal way of meeting both demands.

SUMMARY OF THE INVENTION

In accordance with the present invention in a device for connecting a wiper blade to a driven wiper arm the projections are disposed on a separate component that is firmly joined to the support element so that the separate component surrounds and engages over the support element.

In the connecting device of invention having the, it is possible to make the separately prefabricated component from a wear-resistant material with good sliding properties. The support element, conversely, can be made without disadvantages from a material especially suitable from the standpoint of the elasticity needed. Once the component has been joined to the support element, a support element provided with the lateral projection is obtained that meets all the demands made of it in an optimal way. The support element can also be made in multiple parts and can for instance have two or more parallel sheet-metal strips.

An especially simple connection of the wiper blade to the wiper arm with at the same time an operationally reliable and safe, durable connection that can also be released again in a simple way is achieved if in a refinement of the invention the two projections are each provided with two facing flattened faces, oriented toward the window and located within an imaginary annular jacket face, and if furthermore the recesses assigned to the projections are formed by bores open at the edges, and the edge openings are located at least approximately parallel to the window surface and have a size which is adapted to the spacing between the two flattened faces of a respective projection. In this embodiment of the connection means, assembly steps that are logical to a layperson, and that require a pushing and twisting motion for connection, and a twisting and pulling motion for disassembly, are also obtained.

An especially economical embodiment and production of the component are obtained if the component comprises a plastic, and the two projections are formed onto a base body of the component.

Good lateral guidance of the support element and thus of the wiper blade on the wiper arm is assured if in a further feature of the invention the bores open at the edges are disposed in the legs of a component that is at least partially U-shaped in cross section and that is firmly joined to the wiper arm if furthermore the base of the U is opposite the strip face remote from the window to be wiped; and if, finally, the two legs of the U fit over the facing long sides of the support element. A further advantage in this embodiment is an especially low structural height of the connecting device and thus of the entire wiper blade and wiper arm assembly, which presents only a tiny surface area to engagement by the air flows that prevail on the window surface to be wiped.

If furthermore the component is made from a metal, then especially advantageous sliding partners for the projection and recess bearing can be selected, because during the operating motion of the wiper blade, a constant relative motion between the wiper blade and the wiper arm takes place, dictated for instance by the window, which has many radii of curvature. In a simple way, this choice of materials assures that wear to this bearing point will occur only on the wiper blade, which has to be replaced relatively often in any case, while the wiper arm is protected.

Further advantageous refinements and features of the invention are disclosed in the ensuing description of an exemplary embodiment shown in the associated drawing.

BRIEF DESCRIPTION OF THE DRAWINGS

Shown in the drawing are:

FIG. 8, the disposition of the connection component of FIG. 2 and the connection component element of FIG. 5 before the wiper blade is connected to the wiper arm, shown enlarged but not to scale.

DESCRIPTION OF THE PREFERRED EMBODIMENT

Figure 1:
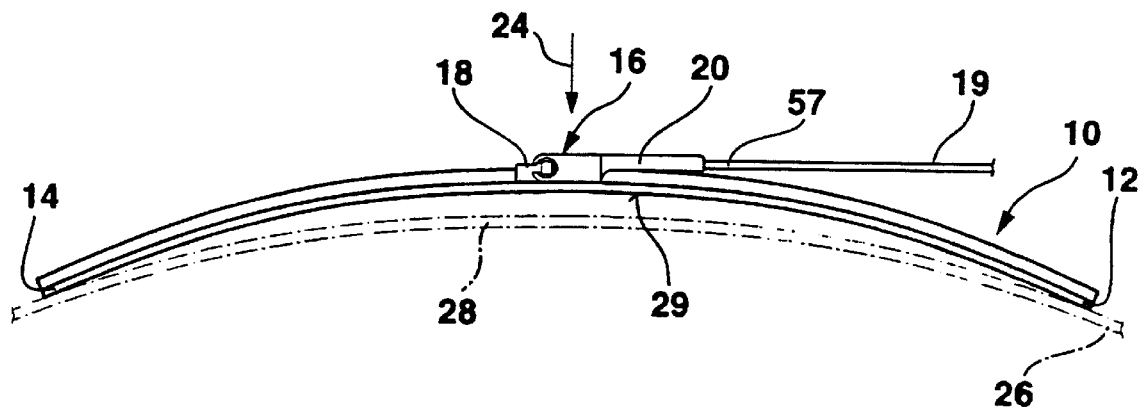
FIG. 1, a side view of a wiper arm to which a wiper blade is connected.

A wiper blade 10 shown in FIG. 1 has a striplike elongated, spring-elastic support element 12, to whose underside an elongated, rubber-elastic wiper strip 14 is secured parallel to the longitudinal axis. A connection component 18 belonging to the connecting device 16 is disposed in the middle portion of the top of the support element, which can also be called a spring rail; with the aid of this component the wiper blade 10 can be connected separably to a driven wiper arm 19. A connection component element 20 embodied as a counterpart connection means is disposed on the free end 57 of the wiper arm 19 and is part of the connecting device 16. The wiper arm 19 is stressed in the direction of the arrow 24 toward the window 26 to be wiped—for instance, the windshield of a motor vehicle—whose surface to be wiped is suggested in FIG. 1 by a dot-dashed line 28. Since the dot-dashed line 28 is intended to represent the greatest curvature of the window surface, it is clear that the curvature of the wiper blade 10, which touches the window 26 at its two ends, is greater than the maximum window curvature. In response to the contact pressure (arrow 24), the wiper blade presses with its wiper lip 29 against the window surface 28. In the process, a tension builds up in the spring-elastic support element 12, which assures proper contact of the wiper strip or wiper lip 29, over its entire length, with the window 26 and uniform distribution of the contact pressure (arrow 24). The connection between the support element 12 and the wiper arm 19 will now be described in further detail in terms of FIGS. 2–8.

Figure 2:
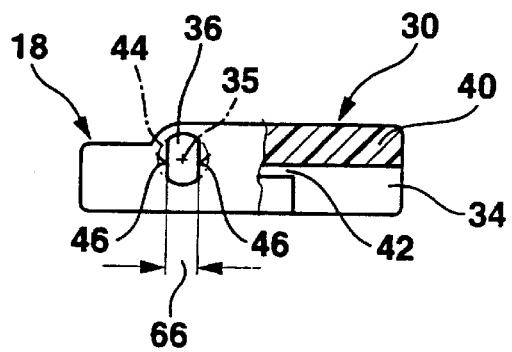
FIG. 2, an enlarged side view, partly in section in the direction of the line II—II in FIG. 3, of a connection component toward the wiper blade.
Figure 3:
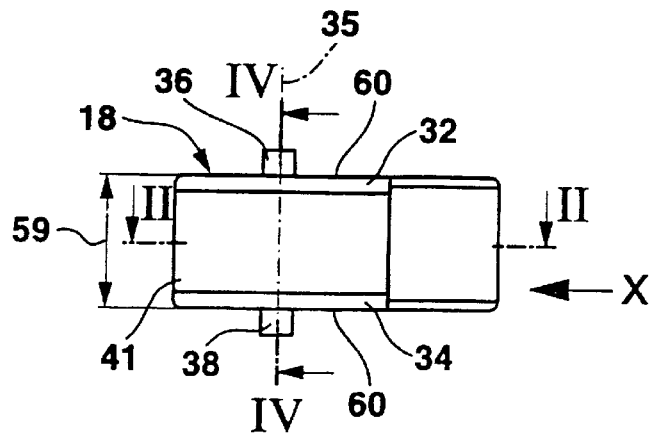
FIG. 3, a view from below of the connection component of FIG. 2.
Figure 4:
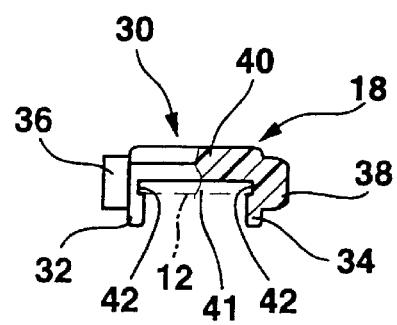
FIG. 4, an elevation view of the connection component in the direction of the arrow X in FIG. 3, in section along the line IV—IV of FIG. 3, and shown offset by 90°.

The aforementioned connecting device 16 includes not only the aforementioned component element 20 toward the wiper arm but also a component 18 toward the wiper blade and belonging to the support element 12; its design can be seen from FIGS. 2–4. The component 18 toward the wiper blade and made of plastic has a substantially U-shaped base body 30 (FIG. 4), onto whose two legs 32 and 34 projections 36 and 38 pointing away from one another are formed. The two projections 36 and 38 have a common longitudinal axis 35. Thus this common longitudinal axis 35 extends across the channel 41, which serves to receive the support element 12 and is defined by the base 40 of the U and the two legs 32 and 34 of the U. This channel is located essentially in a plane parallel to the window 26. The wiper blade 10 can execute a relative motion to the wiper arm 19 about this axis.

In FIG. 4, the support element 12 is shown in dot-dashed lines. It can be seen here as well that the support element 12 dips with its two facing longitudinal edges into grooves 42, which are disposed, facing one another, in the legs 32 and 34 of the U near the base 40 of the U. This design assures a durable seat of the component 18 on the support element 12, whose longitudinal edges can for instance be roughened for this purpose or provided with clawlike teeth. It can also be seen, particularly from FIG. 2, that the two projections 36, 38 are each provided with two flattened faces 46 facing one another, located inside an imaginary annular jacket face 44 (FIG. 2) and oriented toward the window 26; these faces face one another with respect to the common longitudinal axis 35 of the projections.

The component 18 is made from a plastic, whose properties meet the demands made of the component 18. In particular, it should have good sliding properties and high resistance to abrasion. The fastening of the component 18 to the support element 12 (see FIG. 8 as well) can be attained for instance by placing the prefabricated component 18 onto the support element by spreading its two legs 32 and 34 apart. The legs 32 and 34 of the U, as they rebound resiliently, dig into the roughening features of the longitudinal edges of the support element, given suitable dimensioning, and securely hold the component 18 in its predetermined position. However, it is also conceivable for the component to be formed onto the support element 12, in other words, formed by injection molded, or glued or snapped onto it in detent fashion.

Figure 5:
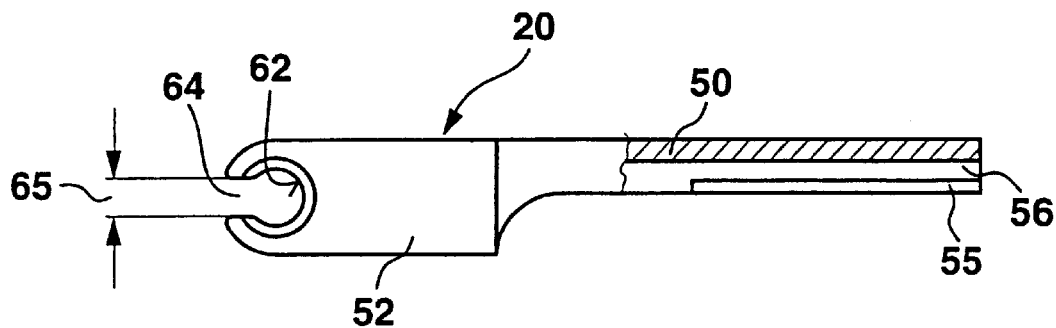
FIG. 5, an enlarged side view, partly in section along the line V—V of FIG. 6, of a connection component element toward the wiper arm.
Figure 6:
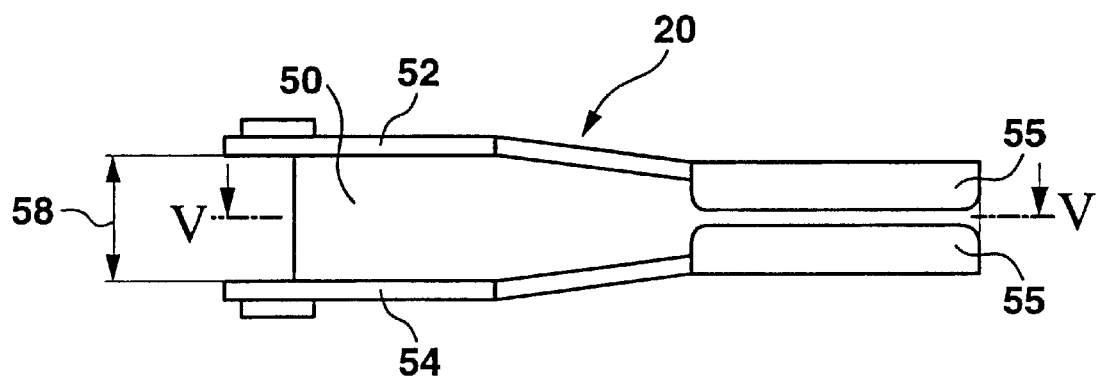
FIG. 6, a view from below of the connection component element of FIG. 5.
Figure 7:
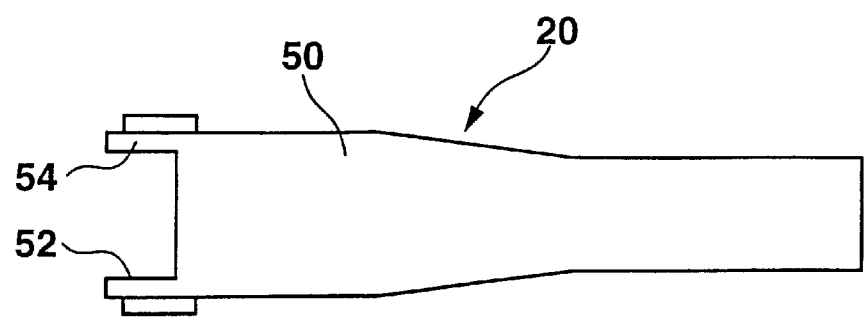
FIG. 7, a plan view on the connection component element of FIG. 5.

The component element 20 toward the wiper arm and belonging to the wiper arm 19 will now described in conjunction with FIGS. 5–7. In this exemplary embodiment, it is made of a metal. It has a U-shaped cross section and hence a base 50 of the U and two legs 52, 54 of the U disposed on the base. On one end of the component element 20, the legs 52 and 54 are provided with tabs 55, pointing counter to one another, so that a securing or insertion channel 56 for the end 57 of the wiper arm is obtained (FIGS. 1 and 5) that is closed virtually all the way around. The connection between the end 57 of the wiper arm and the component element 20 can be made by clamping, gluing, welding, detent locking, or the like. The two legs 52 and 54 of the U are spaced apart by a distance 58 from one another that is adapted to the width 59 of the component 18 in such a way that the two legs 52 and 54 of the component element 20 fit closely, that is, with as little play as possible, over the two long sides 60 of the component 18 that carry the projections 36 and 38. To enable the component element 20 to be joined pivotably yet in captive fashion to the component 18, a bore 62 is disposed in each of the legs 52 and 54 of the component element 20; each bore is open at the edges via a slitlike opening 64. These openings slits 64 are located essentially parallel to the window surface 28. The width 65 of the slit 64 is adapted to the spacing 66 between the two flattened faces 46 on the projections 36 and 38 in such a way that the projections can be introduced into the bores 62 via the two openings 64, one opening assigned to each projection, when the flattened faces are aligned with the lengths of the slits. This arrangement, which also shows the mounting position, is shown in FIG. 8.

The work steps for connecting the wiper blade 10 to the free end 57 of the wiper arm 19 will now be described in further detail, referring to FIG. 8. In it, the support element 12 and the component 18 joined to it are shown in solid lines, while the wiper strip 14 and the surface 28 to be wiped of the window 26 are represented by dot-dashed lines. In a departure from reality, FIG. 8 shows the wiper blade 10 not connected, with the wiper lip 29 contacting the window surface 28. This is merely intended to show the position of the wiper blade on the window when the wiper blade is in its operating position. For connecting the wiper blade 10 to the wiper arm 19 provided with the component element 20, the wiper blade is brought to a position in which the flattened faces 46 of the projections 36, 38 are located in the extension of the slit opening 64. After that, the two projections 36, 38 are introduced into their bores 62, by moving the wiper blade in the direction of the arrow 68 toward the component element 20. Once the two projections 36 and 38 are located all the way inside their bores 62, the wiper blade 10 is rotated in the direction of the arrow 70, until the flattened faces 46 reach the position shown in dot-dashed lines in FIG. 8, in which they are oriented toward the window 26. FIG. 8 clearly shows that the flattened faces 46 are located inside an imaginary jacket face 44, which in FIG. 8 is represented by the wall of the bores 62. It is also clear that in this operating position, shown in dot-dashed lines, of the connecting device it is no longer possible to remove the wiper blade 10 from the wiper arm 9. Since during operation the wiper blade 10 rests on the window 26 to be wiped, the wiper blade cannot be pivoted unintentionally counter to the directional arrow 70, an action that would make it possible to loosen the connecting device. The result is a reliable push-and-twist lock that can also be undone in a simple way again by pivoting the wiper blade 10, lifted away from the window, approximately 90° counter to the direction of the arrow 70, until it is possible to remove the projections 46 through the openings 64 of the bores 62. Accordingly, releasing the connection requires a logical twist and pull motion.

Disposing the connection pivot projections 36, 38 on a separate component 18 connected to the support element 12 makes it possible both for the support element and for the pivot projections to make an optimal choice of materials adapted to the respective demands made of them.

What is claimed is:

1. A device for connecting a wiper blade (10) for windows of motor vehicles to a driven wiper arm (19), guided on the motor vehicle, in which the wiper blade has a strip shaped elongated, spring-elastic support element (12) for an elongated, rubber-elastic wiper strip (14), disposed parallel to the longitudinal axis on the support element (12) and capable of being pressed against the window (26), from each of whose two long sides a respective projection (36, 38) protrudes as a connection means toward the wiper blade; the common longitudinal axis (35) of the two projections is crosswise to the longitudinal axis of the support element and is located in a plane parallel to the window, and each projection engages a recess (62), assigned to it, in the wiper arm (19), and the projections (36, 38) are disposed on a separate component (18) that is firmly joined to the support element (12) so that the separate component (18) surrounds and engages over the support element (12).

2. The device of claim 1, wherein the two projections (36, 38) are each provided with two facing flattened faces (46), located within an imaginary annular jacket face (44), and that the recesses (62) assigned to the projections (36, 38) are formed by bores open at edges, and the edge openings (64) have a size which is adapted to the spacing (66) between the two flattened faces (46) of a respective projection (36 or 38).

3. The device of claim 2, wherein the recesses (62) open at the edges are disposed in legs (52, 54) of a component (20) that is at least partially U-shaped in cross section and that is firmly joined to the wiper arm (19); that the base (50) of the U is opposite the strip face remote from the window (26) to be wiped; and that the two legs (52, 54) of the U fit over the long sides, that face one another, of the support element (12).

4. The device of claim 3, wherein the component (20) is made from a metal.

5. The device of claim 1, wherein the component (18) comprises a plastic, and the two projections (36, 38) are formed onto a base body (30) of the component (18).

* * * * *